(12) United States Patent
Ho et al.

(10) Patent No.: US 10,120,472 B2
(45) Date of Patent: Nov. 6, 2018

(54) TOUCH DISPLAY PANEL (71) Applicant: TPK TOUCH SOLUTIONS (XIAMEN) INC., Xiamen (CN)

(72) Inventors: Kwan-Sin Ho, Miaoli (TW); Zhiming Pu, Xiamen (CN); Hua Yun, Xiamen (CN); Huanyu Zhang, Sanming (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 0 days.

(21) Appl. No.: 14/572,798

(22) Filed: Dec. 17, 2014

(65) Prior Publication Data
US 2015/0309633 A1 Oct. 29, 2015

(30) Foreign Application Priority Data

Apr. 29, 2014 (CN) .......................... 2014 1 0177431

(51) Int. Cl.
*G06F 3/041* (2006.01)
*G06F 1/16* (2006.01)
*G02B 5/30* (2006.01)

(52) U.S. Cl.
CPC ......... *G06F 3/0412* (2013.01); *G02B 5/3025* (2013.01); *G06F 2203/04103* (2013.01)

(58) Field of Classification Search
CPC ...... G06F 3/0412; G06F 1/1643; G06F 3/044; G06F 3/041; G02B 5/3025
See application file for complete search history.

(56) References Cited

U.S. PATENT DOCUMENTS

| | | | | |
|---|---|---|---|---|
| 8,243,027 B2 * | 8/2012 | Hotelling | ............ | G02F 1/13338 345/104 |
| 8,471,828 B2 * | 6/2013 | Liu | ..................... | G02F 1/13338 345/174 |
| 8,907,922 B2 * | 12/2014 | Liu | ..................... | G02F 1/13338 345/174 |
| 9,019,456 B2 * | 4/2015 | Liu | ..................... | G02F 1/13338 345/173 |
| 2002/0167268 A1 * | 11/2002 | Aruga | ............... | G02F 1/133514 313/500 |
| 2006/0146207 A1 * | 7/2006 | Cho | ..................... | G02F 1/13338 349/12 |
| 2007/0281223 A1 * | 12/2007 | Mochizuki | ........ | G02F 1/133512 430/5 |
| 2008/0062148 A1 * | 3/2008 | Hotelling | ............ | G02F 1/13338 345/174 |
| 2008/0246392 A1 * | 10/2008 | Kho | ..................... | H01L 27/322 313/504 |
| 2009/0160817 A1 * | 6/2009 | Wu | ..................... | G06F 3/044 345/173 |
| 2010/0231549 A1 * | 9/2010 | Chien | ................. | G02F 1/13338 345/174 |
| 2011/0102700 A1 * | 5/2011 | Okada | ............... | G02F 1/133305 349/56 |

(Continued)

*Primary Examiner* — Afroza Chowdhury (57) ABSTRACT

A touch display panel includes a display module, a polarizer, a first touch electrode structure and a second touch electrode structure. The display module has a substrate. The polarizer is disposed opposite to the display module. The first touch electrode structure and the second touch electrode structure are electrically insulated to each other and are disposed between the polarizer and the substrate of the display module.

11 Claims, 4 Drawing Sheets (56) References Cited

U.S. PATENT DOCUMENTS

| | | | |
|---|---|---|---|
| 2013/0105206 A1* | 5/2013 | Kim | G06F 3/044 174/257 |
| 2014/0063385 A1* | 3/2014 | Yang | G06F 3/044 349/15 |
| 2014/0176819 A1* | 6/2014 | Yilmaz | G06F 1/1692 349/12 |

* cited by examiner

TOUCH DISPLAY PANEL

This Non-provisional application claims priority under 35 U.S.C. § 119(a) on Patent Application No. 201410177431.5 filed in People's Republic of China on Apr. 29, 2014, the entire contents of which are hereby incorporated by reference.

BACKGROUND OF THE INVENTION

Field of the Invention

The present invention relates to a touch display panel.

Related Art of the Invention

As the progressive of technology, various kinds of information devices, such as cell phones, tablet computers, UMPC, GPS and the likes, have been invented. Except the conventional input approach by keyboard and/or mouse, the touch input technology is an intuitional and popular choice recently. For example, the touch display panel has humanity and intuitional input interface, so the users of any ages can directly operate it by fingers or stylus. Accordingly, the touch display panel products are more and more popular in the market.

The conventional touch display panel mainly includes a touch panel and a display panel. The touch panel has a protective substrate and a sensing substrate, which are configured with a sensing electrode layer respectively. To manufacture a touch display panel, the protective substrate is firstly attached to the sensing substrate to form a touch panel, and then the touch panel is attached to the display panel.

Since the touch panel and the display panel are separately manufactured and then bonded to form the touch display panel, an attaching adhesive layer is needed to be provided between the touch panel and the display panel. Besides, the touch panel is disposed at the one side of the display panel, so the thickness of the touch display panel can not be sufficiently reduced. This thickness feature does not satisfy the requirement of small and compact products.

Therefore, it is an important subject to provide a touch display panel with simple structure and compact size.

SUMMARY OF THE INVENTION

In view of the foregoing subject, an objective of the present invention is to provide a touch display panel with simple structure and compact size.

To achieve the above objective, the present invention discloses a touch display panel including a display module, a polarizer, a first touch electrode structure and a second touch electrode structure. The display module has a substrate. The polarizer is disposed opposite to the display module. The first touch electrode structure and the second touch electrode structure are disposed between the polarizer and the substrate of the display module.

In one embodiment, the first touch electrode structure is disposed on the polarizer, and the second touch electrode structure is disposed on the substrate.

In one embodiment, the touch display panel further includes a transparent substrate disposed between the display module and the polarizer.

In one embodiment, the first touch electrode structure is disposed on the transparent substrate, and the second touch electrode structure is disposed on the substrate. Herein, the first touch electrode structure and the second touch electrode structure are located between the transparent substrate and the display module.

In one embodiment, the first touch electrode structure is disposed on the polarizer, and the second touch electrode structure is disposed on the substrate. Herein, the transparent substrate is located between the first touch electrode structure and the second touch electrode structure.

In one embodiment, the first touch electrode structure is disposed on the polarizer and is located between the polarizer and the transparent substrate.

In one embodiment, the second touch electrode structure is disposed on the transparent substrate and is located between the transparent substrate and the substrate.

In one embodiment, the second touch electrode structure is disposed on the transparent substrate and is located between the polarizer and the transparent substrate.

In one embodiment, at least one of the first touch electrode structure and the second touch electrode structure includes a metal nanowire, a transparent conductive film or a metal mesh.

In one embodiment, at least one shielding layer is disposed on the transparent substrate, and the shielding layer is located at the periphery area of the transparent substrate.

In one embodiment, at least one shielding layer is disposed on the polarizer, and the shielding layer is located at the periphery area of the polarizer.

In one embodiment, an adhesive layer is disposed between the first touch electrode structure ant the second touch electrode structure.

In one embodiment, an adhesive layer is disposed between the transparent substrate and the substrate.

As mentioned above, the touch display panel of the invention has a first touch electrode structure and a second touch electrode structure disposed between the polarizer and the substrate of the display module. This design can reduce the number of substrates, thereby decreasing the weight and thickness of the touch display panel. Furthermore, when each touch electrode structure is disposed under the polarizer, the issue of visible touch electrode structure can be effectively minimized so as to improve the visual effect of the touch display panel.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1A:
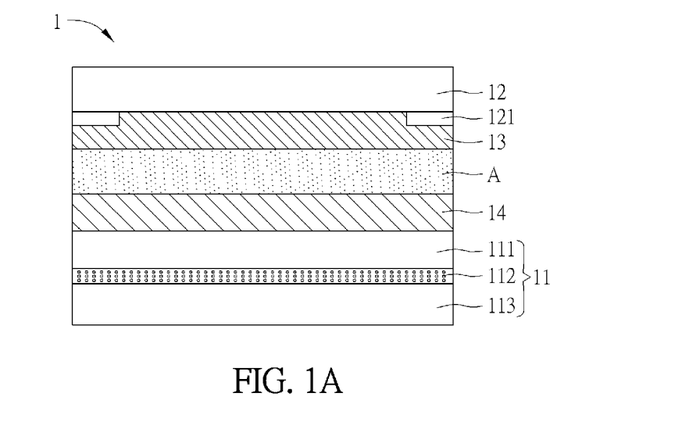
FIG. 1A is a schematic diagram showing a touch display panel according to a first embodiment of the invention.

FIG. 1A is a schematic diagram showing a touch display panel 1 according to a first embodiment of the invention. Referring to FIG. 1A, the touch display panel 1 includes a display module 11, a polarizer 12, a first touch electrode structure 13 and a second touch electrode structure 14. The touch display panel 1 can be applied to, for example but not limited to, a touch control system, an interactive advertising system, a coupon/discount system, an access system, an information searching system, an ATM system or a portable mobile device.

The display module 11 has a substrate 111. In this embodiment, the display module 11 is a liquid crystal display module, which includes a substrate 111, a liquid crystal layer 112 and a TFT substrate 113. The substrate 111 is preferably a color filter substrate. The substrate 111 and the TFT substrate 113 are disposed opposite to each other, and the liquid crystal layer 112 is disposed between the substrate 111 and the TFT substrate 113. However, in other aspects, the display module 11 may be a light-emitting diode (LED) display module or an organic light-emitting diode (OLED) display module, which is composed of an LED layer or an OLED layer instead of the liquid crystal layer 112.

The display module 11 and the polarizer 12 are disposed opposite to each other. In more detailed, the polarizer 12 is disposed above the substrate 111 of the display module 11. That is, the liquid crystal layer 112 and the polarizer 12 are located at two opposite sides of the substrate 111. Herein, the polarizer 12 may include PET film or TAC film, and this invention is not limited thereto. In this embodiment, the polarizer 12 is functioned as a cover glass of the touch display panel 1. One side of the polarizer 12 away from the substrate 111 is provided for direct contact operation of the user. Besides, additional functional layers, such as anti-glare layer, anti-smudge layer, anti-fingerprint layer and/or anti-reflective layer, can be disposed on the polarizer 12.

An adhesive layer A is disposed between the first touch electrode structure 13 and the second touch electrode structure 14 for providing electrical insulation therebetween. The first touch electrode structure 13 and the second touch electrode structure 14 are disposed between the polarizer 12 and the substrate 111 of the display module 11. In this embodiment, the first touch electrode structure 13 is disposed on the polarizer 12, and the second touch electrode structure 14 is disposed on the substrate 111. In more detailed, the first touch electrode structure 13 is located at one side of the polarizer 12 facing the display module 11, which is the lower side of the polarizer 12. The second touch electrode structure 14 is located at one side of the substrate 111 facing the polarizer 12, which is the upper side of the substrate 111. In this embodiment, the first touch electrode structure 13 is directly formed on the polarizer 12, so that the polarizer 12 attaches to or supports the first touch electrode structure 13. This configuration can utilize one substrate less than the conventional touch electrode structure, thereby decreasing the entire thickness of the touch display panel. The second touch electrode structure 14 is directly formed on the substrate 111, so that the substrate 111 attaches to or supports the second touch electrode structure 14. The first touch electrode structure 13 and the second touch electrode structure 14 can be formed by, for example but not limited to, coating, printing or etching. In this case, the first touch electrode structure 13 has an electrode pattern of a first axial direction, while the second touch electrode structure 14 has an electrode pattern of a second axial direction, which is cross to the first axial direction. For example, the second axial direction may be perpendicular to the first axial direction.

To be noted, before forming the first touch electrode structure 13, at least one shielding layer 121 is disposed on the polarizer 12. In this embodiment, the shielding layer 121 is made of ink, photoresist, or their combination, and it can be disposed on a part of the polarizer 12 and located at one side of the polarizer 12 facing the substrate 111 so as to form a non-visible area at the periphery area of the polarizer 12. On the other hand, the residual part of the polarizer 12 not covered by the shielding layer 121 forms a visible area. The shielding layer 121 can shield the external wires (not shown) of the first touch electrode structure 13 or other circuit components not to be viewed by the users, thereby making the touch display panel with more beautiful appearance.

In addition, the first touch electrode structure 13 and/or the second touch sensing layer 14 may include metal nanowire, transparent conductive film or metal mesh. The metal nanowire can be, for example, silver nanowire (SNW) or carbon nanotubes (CNT). The transparent conductive film can be, for example, indium tin oxide (ITO), indium zinc oxide (IZO), fluorine doped tin oxide (FTO), aluminum doped zinc oxide (AZO), gallium doped zinc oxide (GZO) or graphene. Moreover, a protective layer (not shown) can be disposed on the first touch electrode structure 13 and/or the second touch sensing layer 14. The protective layer is made of insulation material for protecting the transparent conductive film or metal of the first touch electrode structure 13 and/or the second touch sensing layer 14 from oxidation.

Figure 1B:
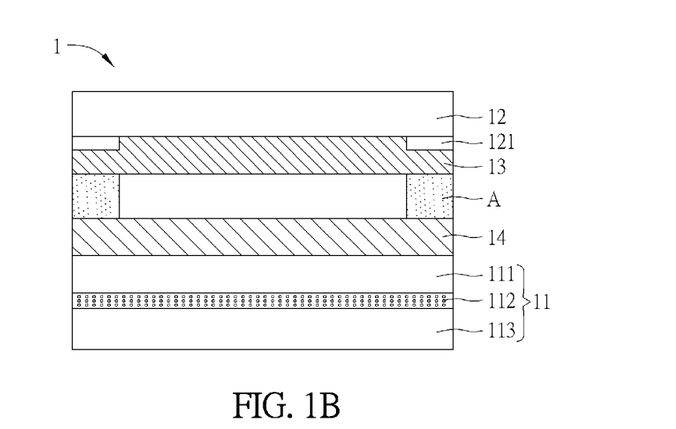
FIG. 1B is a schematic diagram showing a polarizer attached to a display module.

In this embodiment, an adhesive layer A is disposed between the first touch electrode structure 13 and the second touch sensing layer 14. In more specific, the polarizer 12 formed with the first touch electrode structure 13 is attached to the second touch electrode structure 14 formed on the substrate 111 by the adhesive layer A. Moreover, one surface of the first touch electrode structure 13 is attached to the second touch sensing layer 14. In practice, the adhesive layer A is an optical adhesive, which is light permeable and can fully attach the first touch electrode structure 13 on the second touch sensing layer 14. However, in other aspects, the adhesive layer A can be made of opaque material, and is disposed corresponding to the area of the shielding layer 121 for edge lamination (see FIG. 1B). Of course, the edge lamination process may also be performed by an adhesive layer made of transparent material, and this invention is not limited.

Accordingly, the touch display surface of the touch display panel 1 is one surface of the polarizer 12 away from the substrate 111. As shown in the figures, the touch display surface is the upper surface of the polarizer 12. The first touch electrode structure 13 and the second touch electrode structure 14 are located under the polarizer 12. Since the transmittance of the polarizer 12 is lower than that of the normally or basically transparent substrate, it can improve the issue of the visible electrode patterns of the first touch electrode structure 13 and the second touch electrode structure 14. This configuration can further enhance the effect of shielding wires so as to improve the visual effect of the touch display panel 1. Otherwise, when some opaque or high-reflective components are disposed between the first touch electrode structure 13 and the second touch electrode structure 14 (e.g. the metal nanowires or metal mesh formed on the polarizer 12), the polarizer 12 can further decrease the visibility of these components, thereby further improving the visual effect of the touch display panel.

Figure 2:
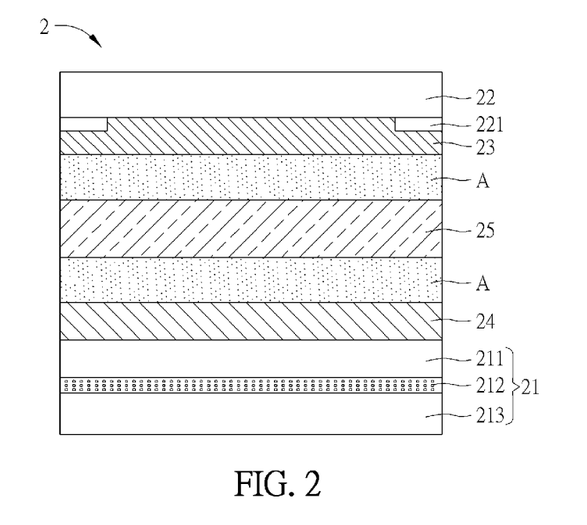
FIG. 2 is a schematic diagram showing a touch display panel according to a second embodiment of the invention.

FIG. 2 is a schematic diagram showing a touch display panel 2 according to a second embodiment of the invention. Referring to FIG. 2, the touch display panel 2 includes a display module 21, a polarizer 22, a first touch electrode structure 23 and a second touch electrode structure 24. In this embodiment, the display module 21 is also a liquid crystal display module, which includes a substrate 211, a liquid crystal layer 212 and a TFT substrate 213. The substrate 211 is a color filter substrate. Most elements of this embodiment can be referred to the previous description, and only the part different from the above embodiment will be described hereinafter.

In this embodiment, the touch display panel 2 further includes a transparent substrate 25 disposed between the display module 21 and the polarizer 22. The transparent substrate 25 can be made of a transparent material such as glass or plastic material. Herein, the polarizer 22 formed with the first touch electrode structure 23 is attached to the transparent substrate 25 by an adhesive layer A, and one surface of the first touch electrode structure 23 is attached to the transparent substrate 25. The first touch electrode structure 23 and the second touch electrode structure 24 are electrically insulated with each other by the adhesive layer A and the transparent substrate 25. In practice, the adhesive layer A is an optical adhesive with light-permeable property and is configured for full lamination the first touch electrode structure 23 on the transparent substrate 25. Of course, in other aspects, the adhesive layer A can be carried out by edge lamination as described in the first embodiment, so the detailed description thereof will be omitted here. In addition, the transparent substrate 25 can be attached to the second touch electrode structure 24 by an additional adhesive layer A. Accordingly, the strength intensity of the touch display panel 2 can be enhanced so as to prevent the break and damage thereof. Besides, when the transparent substrate 25 is an internal polarizer, which has similar properties as the polarizer 22, it can improve the issue of visible electrode patterns or other components.

Similarly, before forming the second touch electrode structure 24, at least one shielding layer 221 can be formed on the polarizer 22. Herein, the shielding layer 221 is located at the periphery of the polarizer 22. The description thereof can be referred to the previous embodiment, so it is not repeated here.

Figure 3:
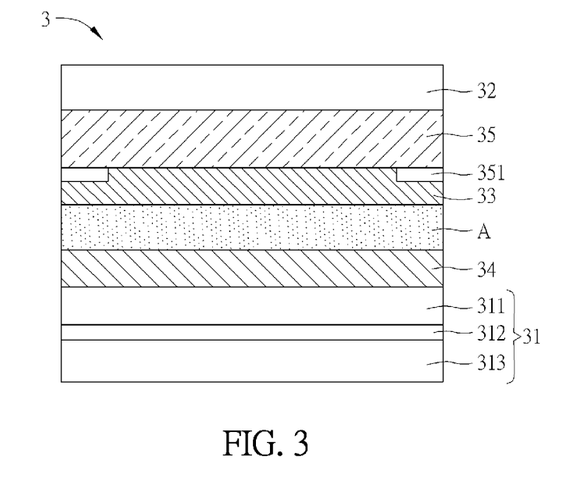
FIG. 3 is a schematic diagram showing a touch display panel according to a third embodiment of the invention.

FIG. 3 is a schematic diagram showing a touch display panel 3 according to a third embodiment of the invention. Referring to FIG. 3, the touch display panel 3 includes a display module 31, a polarizer 32, a first touch electrode structure 33, a second touch electrode structure 34 and a transparent substrate 35.

In this embodiment, the display module 31 is an OLED display module including a substrate 311, an organic stack 312 and a TFT substrate 313. The substrate 311 and the TFT substrate 313 are disposed opposite to each other, and the organic stack 312 is disposed between the substrate 311 and the TFT substrate 313. Of course, in other aspects, the display module can be a liquid crystal display module or an LED display module.

In this embodiment, the first touch electrode structure 33 is disposed on the transparent substrate 35, and the second touch electrode structure 34 is disposed on the substrate 311. An adhesive layer A is disposed between the first touch electrode structure 33 and the second touch electrode structure 34, so that the first touch electrode structure 33 and the second touch electrode structure 34 can be electrically insulated from each other through the adhesive layer A. Moreover, the first touch electrode structure 33 is located at one side of the transparent substrate 35 facing the display module 31, which is the lower side of the transparent substrate 35. The second touch electrode structure 34 is located at one side of the substrate 311 facing the transparent substrate 35, which is the upper side of the substrate 311. In other words, the first touch electrode structure 33 and the second touch electrode structure 34 are located between the transparent substrate 35 and the display module 31.

In this embodiment, the first touch electrode structure 33 is directly formed on the transparent substrate 35, so that the transparent substrate 35 attaches to or supports the first touch electrode structure 33. The second touch electrode structure 34 is directly formed on the substrate 311, so that the substrate 311 attaches to or supports the second touch electrode structure 34. This configuration can reduce the necessary sensing substrate of the conventional art so as to decrease the entire thickness of the touch display panel. The first touch electrode structure 33 and the second touch electrode structure 34 can be formed by, for example but not limited to, coating, printing or etching. In this case, the first touch electrode structure 33 has an electrode pattern of a first axial direction, while the second touch electrode structure 34 has an electrode pattern of a second axial direction, which is cross to the first axial direction. For example, the second axial direction may be perpendicular to the first axial direction.

In addition, before forming the first touch electrode structure 33, at least one shielding layer 351 is disposed on the transparent substrate 35. In this embodiment, the shielding layer 351 is made of ink, photoresist, or their combination, and it can be disposed on a part of the transparent substrate 35 and located at one side of the transparent substrate 35 facing the substrate 311 so as to form a non-visible area at the periphery area of the transparent substrate 35. The residual part of the transparent substrate 35 not covered by the shielding layer 351 forms a visible area. The shielding layer 351 can shield the external wires (not shown) of the first touch electrode structure 33 or other circuit components not to be viewed by the users, thereby making the touch display panel with more beautiful appearance.

The first touch electrode structure 33 and/or the second touch sensing layer 34 may include metal nanowire, transparent conductive film or metal mesh. The metal nanowire can be, for example, silver nanowire (SNW) or carbon nanotubes (CNT). The transparent conductive film can be, for example, indium tin oxide (ITO), indium zinc oxide (IZO), fluorine doped tin oxide (FTO), aluminum doped zinc oxide (AZO), gallium doped zinc oxide (GZO) or graphene. Moreover, a protective layer (not shown) can be disposed on the first touch electrode structure 33 and/or the second touch sensing layer 34. The protective layer is made of insulation material for protecting the transparent conductive film or metal of the first touch electrode structure 33 and/or the second touch sensing layer 34 from oxidation.

In this embodiment, an adhesive layer A is disposed between the first touch electrode structure 33 and the second touch sensing layer 34. In more specific, the transparent substrate 35 formed with the first touch electrode structure 33 is attached to the second touch electrode structure 34 formed on the substrate 311 by the adhesive layer A. Moreover, one surface of the first touch electrode structure 33 is attached to the second touch sensing layer 34. In practice, the adhesive layer A is an optical adhesive, which is light permeable and can fully attach the first touch electrode structure 33 on the second touch sensing layer 34. Of course, in other aspects, the adhesive layer A can also be formed by edge lamination as described in the first embodiment, so the detailed description thereof will be omitted here.

In this embodiment, the polarizer 32 is disposed on the transparent substrate 35, and the polarizer 32 and the first touch electrode structure 33 are located at opposite two sides of the transparent substrate 35. Accordingly, the touch display surface of the touch display panel 3 is one surface of the polarizer 32 away from the substrate 311. As shown in the figure, the touch display surface is the upper surface of the polarizer 32. The first touch electrode structure 33 and the second touch electrode structure 34 are located under the polarizer 32. Since the transmittance of the polarizer 32 is lower than that of the normally or basically transparent substrate, it can improve the issue of the visible electrode patterns of the first touch electrode structure 33 and the second touch electrode structure 34 when the first touch electrode structure 33 and the second touch electrode structure 34 are located between the polarizer 32 and the substrate 311 of the display module 31 so as to covering the touch electrode structures by the polarizer 32. This configuration can further enhance the effect of shielding wires so as to improve the visual effect of the touch display panel 3. Otherwise, when some opaque or high-reflective components are disposed between the first touch electrode structure 33 and the second touch electrode structure 34 (e.g. the metal nanowires or metal mesh formed on the polarizer 32), the polarizer 32 can further decrease the visibility of these components, thereby further improving the visual effect of the touch display panel.

Figure 4:
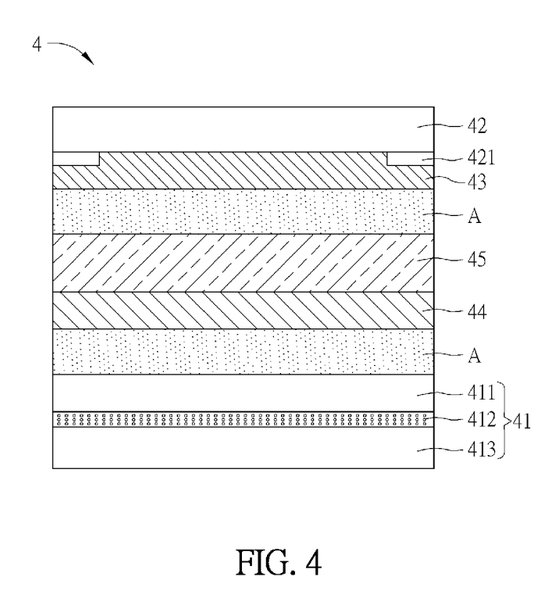
FIG. 4 is a schematic diagram showing a touch display panel according to a fourth embodiment of the invention.

FIG. 4 is a schematic diagram showing a touch display panel 4 according to a fourth embodiment of the invention. Referring to FIG. 4, the touch display panel 4 includes a display module 41, a polarizer 42, a first touch electrode structure 43, a second touch electrode structure 44 and a transparent substrate 45. In this embodiment, the display module 41 is a liquid crystal display module, which includes a substrate 411, a liquid crystal layer 412 and a TFT substrate 413. The substrate 411 is a color filter substrate.

In this embodiment, the first touch electrode structure 43 is disposed on the polarizer 42 and is located between the polarizer 42 and the transparent substrate 45. The second touch electrode structure 44 is disposed on the transparent substrate 45 and is located between the transparent substrate 45 and the substrate 411. An adhesive layer and the transparent substrate 45 are disposed between the first touch electrode structure 43 and the second touch electrode structure 44, so that the first touch electrode structure 43 and the second touch electrode structure 44 can be electrically insulated from each other through the adhesive layer and the transparent substrate 45.

Moreover, the first touch electrode structure 43 is located at one side of the polarizer 42 facing the display module 41, which is the lower side of the polarizer 42. The second touch electrode structure 44 is located at one side of the transparent substrate 45 facing the substrate 411, which is the lower side of the transparent substrate 45. In this embodiment, the first touch electrode structure 43 is directly formed on the polarizer 42, so that the polarizer 42 attaches to or supports the first touch electrode structure 43. This configuration can reduce one substrate in the touch electrode structure of the conventional art so as to decrease the entire thickness of the touch display panel. The second touch electrode structure 44 is directly formed on the transparent substrate 45, so that the transparent substrate 45 attaches to or supports the second touch electrode structure 44. The first touch electrode structure 43 and the second touch electrode structure 44 can be formed by, for example but not limited to, coating, printing or etching. In this case, the first touch electrode structure 43 has an electrode pattern of a first axial direction, while the second touch electrode structure 44 has an electrode pattern of a second axial direction, which is cross to the first axial direction. For example, the second axial direction may be perpendicular to the first axial direction.

To be noted, before forming the first touch electrode structure 43, at least one shielding layer 421 is disposed on the polarizer 42. In this embodiment, the shielding layer 421 is made of ink, photoresist, or their combination, and it can be disposed on a part of the polarizer 42 and located at one side of the polarizer 42 facing the transparent substrate 45 so as to form a non-visible area at the periphery area of the polarizer 42. The residual part of the polarizer 42 not covered by the shielding layer 421 forms a visible area. The shielding layer 421 can shield the external wires (not shown) of the first touch electrode structure 43 or other circuit components not to be viewed by the users, thereby making the touch display panel with more beautiful appearance.

In this embodiment, an adhesive layer A is disposed between the first touch electrode structure 43 and the transparent substrate 45. In more specific, the polarizer 42 formed with the first touch electrode structure 43 is attached to the transparent substrate 45 by the adhesive layer A. Moreover, one surface of the first touch electrode structure 43 is attached to the transparent substrate 45. In practice, the adhesive layer A is an optical adhesive, which is light permeable and can fully attach the first touch electrode structure 43 on the transparent substrate 45. Of course, in other aspects, the adhesive layer A can also be formed by edge lamination as described in the first embodiment, so the detailed description thereof will be omitted here.

In addition, an additional adhesive layer A can be disposed between the second touch electrode structure 44 and the display module 41. In this embodiment, the transparent substrate 45 formed with the second touch electrode structure 44 can be attached to the display module 41 by an additional adhesive layer A. Moreover, one surface of the second touch electrode structure 44 is attached to the display module 41. Similarly, the additional adhesive layer A can attach the second touch electrode structure 44 on the display module 41 by full lamination or edge lamination as described in the previous embodiments, so the detailed description thereof will be omitted here.

Accordingly, the touch display surface of the touch display panel 4 is one surface of the polarizer 42 away from the transparent substrate 45. As shown in the figure, the touch display surface is the upper surface of the polarizer 42. The first touch electrode structure 43 and the second touch electrode structure 44 are located under the polarizer 42. Since the transmittance of the polarizer 42 is lower than that of the normally or basically transparent substrate, it can improve the issue of the visible electrode patterns of the first touch electrode structure 43 and the second touch electrode structure 44. This configuration can further enhance the effect of shielding wires so as to improve the visual effect of the touch display panel 4. Otherwise, when some opaque or high-reflective components are disposed between the first touch electrode structure 43 and the second touch electrode structure 44 (e.g. the metal nanowires or metal mesh formed on the polarizer 42), the polarizer 42 can further decrease the visibility of these components, thereby further improving the visual effect of the touch display panel.

Figure 5:
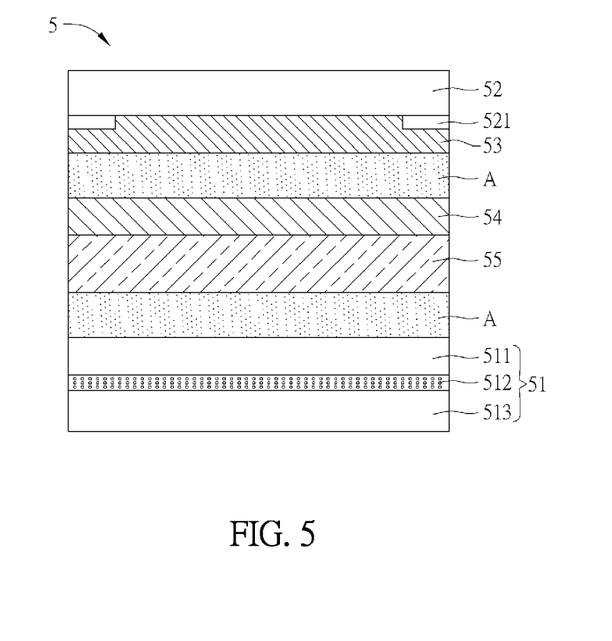
FIG. 5 is a schematic diagram showing a touch display panel according to a fifth embodiment of the invention.

FIG. 5 is a schematic diagram showing a touch display panel 5 according to a fifth embodiment of the invention. Referring to FIG. 5, the touch display panel 5 includes a display module 51, a polarizer 52, a first touch electrode structure 53, a second touch electrode structure 54 and a transparent substrate 55. In this embodiment, the display module 51 is a liquid crystal display module, which includes a substrate 511, a liquid crystal layer 512 and a TFT substrate 513. The substrate 511 is a color filter substrate. The fifth embodiment is mostly the same as the previous fourth embodiment, and their different is in that the second touch electrode structure 54 of the fifth embodiment is disposed on the transparent substrate 55. The transparent substrate 55 attaches to or supports the second touch electrode structure 54, and the second touch electrode structure 54 is located between the polarizer 52 and the transparent substrate 55. An adhesive layer A is disposed between the first touch electrode structure 53 and the second touch electrode structure 54, so that the first touch electrode structure 53 and the second touch electrode structure 54 can be electrically insulated by the adhesive layer A.

In this embodiment, the second touch electrode structure 54 is disposed on the transparent substrate 55 and is located at one side of the transparent substrate 55 facing the polarizer 52, which is the upper side of the transparent substrate 55. Herein, the polarizer 52 formed with the first touch electrode structure 53 is attached to the second touch electrode structure 54 formed on the transparent substrate 55 by the adhesive layer A. Besides, the first touch electrode structure 53 and the second touch electrode structure 54 are located between the polarizer 52 and the transparent substrate 55. Moreover, the transparent substrate 55 can be attached to the display module 51 by an additional adhesive layer A as shown in FIG. 5.

In this embodiment, at least one shielding layer 521 is disposed on the polarizer 52. The shielding layer 521 is made of ink, photoresist, or their combination, and it can be disposed on a part of the polarizer 52 and located at one side of the polarizer 52 facing the transparent substrate 55 so as to form a non-visible area at the periphery area of the polarizer 52. The residual part of the polarizer 52 not covered by the shielding layer 521 forms a visible area. The shielding layer 521 can shield the external wires (not shown) of the first touch electrode structure 53 or other circuit components not to be viewed by the users, thereby making the touch display panel 5 with more beautiful appearance.

In summary, the touch display panel of the invention has a first touch electrode structure and a second touch electrode structure disposed between the polarizer and the substrate of the display module. This design can reduce the number of substrates, thereby decreasing the weight and thickness of the touch display panel. Furthermore, when each touch electrode structure is disposed under the polarizer, the issue of visible touch electrode structure can be effectively minimized so as to improve the visual effect of the touch display panel.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A touch display panel, comprising:
a display module comprising a color filter substrate, a TFT substrate, and a liquid crystal layer, wherein the liquid crystal layer is disposed between the color filter substrate and the TFT substrate;
a polarizer disposed opposite to the display module;
a first touch electrode structure;
a second touch electrode structure, wherein the first touch electrode structure and the second touch electrode structure are electrically insulated from each other at least by an adhesive layer and are disposed between the polarizer and the color filter substrate of the display module;
a transparent substrate located between the display module and the polarizer;
an additional adhesive layer, located between the transparent substrate and the display module; and
a shielding layer, disposed below the polarizer, and the shielding layer is located at the side edge area of the polarizer.

2. The touch display panel of claim 1, wherein:
the first touch electrode structure is disposed below the polarizer, and
the adhesive layer is disposed below the first touch electrode structure.

3. The touch display panel of claim 2, wherein:
the second touch electrode structure is disposed on the color filter substrate, and
the transparent substrate is disposed below the adhesive layer and
the additional adhesive layer is located between the transparent substrate and the second touch electrode structure.

4. The touch display panel of claim 2, wherein
the transparent substrate is disposed below the adhesive layer;
the second touch electrode structure is disposed below the transparent substrate and
the additional adhesive layer is located between the second touch electrode structure and the color filter substrate.

5. The touch display panel of claim 2, wherein
the second touch electrode structure is disposed below the adhesive layer;
the transparent substrate is disposed below the second touch electrode structure; and
the additional adhesive layer is located between the transparent substrate and the color filter substrate.

6. The touch display panel of claim 1, wherein at least one of the first touch electrode structure or the second touch electrode structure comprises a metal nanowire, a transparent conductive film or a metal mesh.

7. A touch display panel, comprising:
a display module comprising a substrate, a TFT substrate, and an organic stack disposed therebetween;
a polarizer disposed opposite to the display module;
a transparent substrate disposed on the polarizer;
a first touch electrode structure disposed on the transparent substrate;
a second touch electrode structure in direct contact with the substrate; and
an adhesive layer in direct contact with the first touch electrode structure and the second touch electrode structure;
wherein the first touch electrode structure and the second touch electrode structure are electrically insulated from each other and are disposed between the polarizer and the substrate of the display module; and
a shielding layer, is disposed below the polarizer, and the shielding layer is located at the side edge area of the polarizer.

8. The touch display panel of claim 7, wherein at least one of the first touch electrode structure or the second touch electrode structure comprises a metal nanowire, a transparent conductive film or a metal mesh.

9. The touch display panel of claim 7, further comprising:
a shielding layer, disposed below the transparent substrate.

10. The touch display panel of claim 9, wherein the adhesive layer is formed corresponding to the area of the shielding layer.

11. The touch display panel of claim 1, wherein at least one of the adhesive layer or the additional adhesive layer is formed corresponding to the area of the shielding layer.

* * * * *